United States Patent [19]
Doerer

[11] 4,102,975
[45] Jul. 25, 1978

[54] METHOD OF TREATING AND FORMING A PANEL

[75] Inventor: Richard P. Doerer, Grosse Pointe, Mich.

[73] Assignee: Van Dresser Corporation, Detroit, Mich.

[21] Appl. No.: 661,387

[22] Filed: Mar. 1, 1976

Related U.S. Application Data

[63] Continuation-in-part of Ser. No. 344,869, Mar. 26, 1973, Pat. No. 3,948,708.

[51] Int. Cl.$^2$ .............................................. B29J 1/02
[52] U.S. Cl. .................................... 264/322; 264/134; 264/136; 264/320
[58] Field of Search ................ 264/134, 136, 322, 324

[56] References Cited

U.S. PATENT DOCUMENTS

| | | | |
|---|---|---|---|
| 2,338,685 | 1/1944 | Dee | 264/322 |
| 2,414,177 | 1/1947 | Smith | 264/286 |
| 2,595,501 | 5/1952 | Aicher | 264/322 X |
| 2,924,852 | 2/1960 | Michalko | 264/324 X |
| 3,675,692 | 7/1972 | Jeans | 264/322 X |
| 3,758,357 | 9/1973 | Akerson | 264/324 X |
| 3,948,708 | 4/1976 | Doerer | 156/196 |
| 3,983,677 | 10/1976 | Lundbom | 264/234 X |

*Primary Examiner*—Richard R. Kucia
*Attorney, Agent, or Firm*—Whittemore, Hulbert & Belknap

[57] ABSTRACT

A method of forming a flexible sheetlike structure such as an automotive headliner by treating a sheet of fiberboard or other similar material with water at an elevated temperature to make the sheet sufficiently ductile to permit forming without tearing or blowing, and placing the water-treated sheet between heated dies to form the sheet to a compound curvature by the application of heat and pressure. The sheet may or may not be perforated. The method also includes finishing one side of the die-formed sheet by securing a decorative or sound-absorbing layer thereto. The sheet is placed on a support and the layer is applied over the adhesive coated upper surface of the sheet. A cover is draped over the support to provide an air seal over the layer and sheet and is drawn against the support by differential pressure, either pressure or vacuum to press the layer against the sheet and adhere the two together.

6 Claims, 12 Drawing Figures

METHOD OF TREATING AND FORMING A PANEL

CROSS-REFERENCE TO RELATED APPLICATION

This application is a continuation-in-part of my prior copending application Ser. No. 344,869, filed Mar. 26, 1973, now U.S. Pat. No. 3,948,708.

BACKGROUND AND SUMMARY OF THE INVENTION

The method of this invention is employed to reform panels of fibrous material such as fiberboard or hardboard, into curved self-supporting structures such as automotive headliners. Fiberboard or hardboard panels usually include resin binders which impart a substantial resistance to bending so that the sheet has a tendency to tear or crease when deformed or re-formed into a compound curvature. Moreover, the fiberboard panels tend to return to their original flat shape after being re-formed unless the fibers are actually shifted during the re-forming process.

The method includes applying water to a sheet of woodlike fibrous material, such as panels of ordinary fiberboard or hardboard which may or may not be perforated. The water is applied at an elevated temperature to the sheet in an amount sufficient to render the sheet ductile enough to permit forming without tearing or blowing and thereafter the water-treated sheet is formed to the desired curvature in a die under pressure. A water temperature between about 180° F. and about 212° F. is preferred in order to break down or soften the resin binders which permeate the body of the fiberboard or hardboard material. Temperatures as low as 120° F. are sufficient for the purpose, however.

The panel need not have perforations. However, the presence of perforations to some extent will serve to weaken the structural makeup of the panel and thereby aid in permanent re-forming. Such perforations also provide voids into which fibers may be shifted during re-forming and furthermore provide a means for entry and escape of the water into and out of the body of the sheet during the re-forming process.

The water reduces the rigidity of the resin binders, whether thermoplastic or thermosetting, and moistens or lubricates and softens the structure of the fibrous material itself, but does not saturate or soak the panel material to an extent that would cause blowing when the panel is re-formed in the hot press. It is desirable that the panel be sufficiently moistened so as to be rendered ductile to permit forming without tearing or creasing, and yet not overtreated with water to the extent of soaking the internal structure and making it likely to blow when being formed. By "blowing" is meant the rupture of the panel from internal pressure caused by an excess of steam generated by too much water in the body of the panel when heated in the press.

The panel is preferably formed between heated dies under a pressure sufficient to actually cause material flow of the fibers in the areas of curvature. The re-forming takes place without tearing or blowing. When the panel is removed from the dies, most of the moisture has been driven out and the resin binders return to a rigid or semi-rigid condition to retain the re-formed shape.

After the panel has been water treated and re-formed in a heated press, a decorative and/or sound-absorbing layer may be applied thereto. This is accomplished by placing the re-formed panel upon a contoured support, applying adhesive to the upper surface of the panel, and laying the sound-absorbing layer over the adhesive coated sheet. The layer is adhered to the sheet preferably by draping a cover over the support to form an air seal and applying differential pressure, in this instance vacuum through the support to draw the cover toward the support and against the layer to adhere the layer to the sheet.

The prior art teaches the use of steam to render the panel ductile before placing it between heated dies. Thus in accordance with the prior art the panel is initially placed in a steam chest or chamber. However, in a steam chest, drops of water form and fall on the panel producing concentrated circles of excessive moisture which show up on the finished panel after it has been die formed and dried. The circles of excessive moisture are believed to form high spots by causing swelling of the panel material. The panel high spots tend to become over-compressed in the die and produce slight dimples which show through the sound-absorbing or decorative layer adhered to the panel. Such dimples or show-through marks are undesirable because they produce an unsightly appearance. Wet spots in the board due to drips from the steam chest also tend to show up in the finished panel through a painted surface in instances where the board is painted rather than laminated by adhesive to a sound-absorbing or decorative layer.

Panels treated with water at elevated temperatures rather than in a steam chest prior to die forming have been found to be free of the objection of water marks or wet spots.

Figure 1:
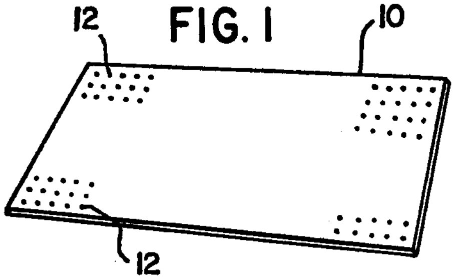
FIG. 1 is a perspective view of a perforated fiberboard panel in its initial generally flat condition.

Referring now more particularly to the drawings, the panel shown in FIG. 1 is a commercially available fiberboard or hardboard panel 10 which is relatively inexpensive and yet provides a fairly strong resilient structure. Fiberboard panels of this type are commercially available from many sources. The fiberboard is formed from steam exploded wood fibers in a resin binder which may be thermosetting or thermoplastic, making such panels difficult to form into complex or compound curvatures. The resin binder causes the panel to tend to return to its original flat shape, when re-formed. Furthermore the material of the panel tends to blow when oversoaked or saturated with too much water or to tear when re-formed without wetting. The method of this invention is adapted to wet the panel with a limited amount of water at an elevated temperature to permit re-forming without either tearing or blowing.

The fiberboard panel 10 is adapted to be reformed into a contoured or curved structure, and is particularly suited when re-formed for use in an automotive headliner, although it should be understood that the invention is not limited to the use of the re-formed panel for such purposes.

Figure 2:
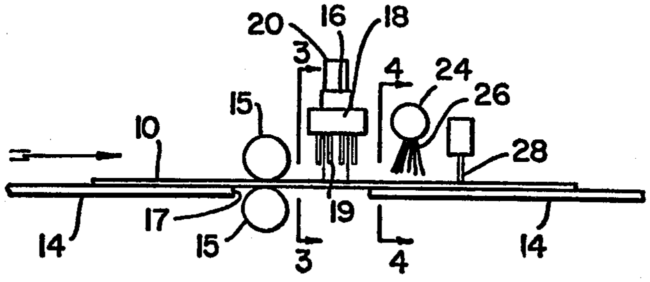
FIG. 2 is a diagrammatic side elevational view of apparatus for perforating and water-treating the panel.
Figure 3:
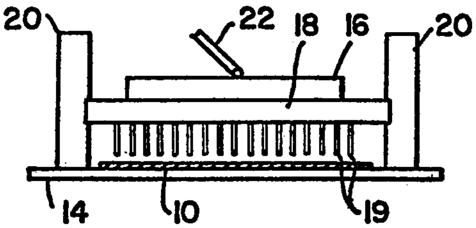
FIG. 3 is a sectional view taken along the line 3—3 of FIG. 2.
Figure 4:
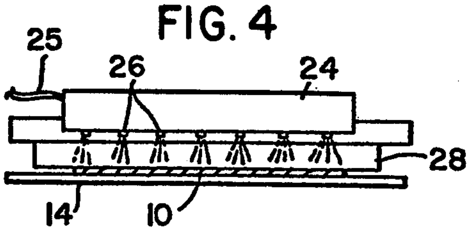
FIG. 4 is a sectional view taken along the line 4—4 on FIG. 2.

The panel is shown in FIG. 1 as having the perforations 12 formed in it. The panel is shown in FIGS. 2–4 during steps in the method in which the perforations are formed and the panel water-treated in one continuous operation. It will be understood however that the perforations may if desired be made in the panel as a separate step prior to water treatment. It will be further understood the perforations may in the broader aspects of the invention, be omitted altogether, although they are beneficial from the standpoint of weakening the resistance of the panel to bending, in other words, making the panel more readily reformable from the flat to a contoured configuration. Perforations also provide voids for the shifting fibers during re-forming and a means for entry and escape of water.

The perforations may vary in size but in the present instance are about three thirty-seconds of an inch in diameter and are arranged in parallel rows one-quarter inch apart with the perforations in each row themselves spaced one-quarter inch apart and respectively substantially aligned with the perforations in the adjacent rows. The panel in this instance has a thickness of one-tenth of an inch. It will be understood of course that thicker or thinner panels may be used and that other hole diameters and spacing may be employed, although the dimensions here given have been found to be suitable for manufacture and re-forming of automotive headliners. The panel may be and preferably is perforated and water-treated in one continuous operation as shown in FIGS. 2–4. As seen in those Figures, the panel is advanced intermittently on a table 14 by feed rolls 15 in the direction of the arrow. The conveyor is operated intermittently to advance the panel increments of a predetermined distance. A perforating device 16 is operated while the panel is stationary to form one or several rows of perforations in the panel, and then the panel is advanced by rolls 15 a further increment in preparation for the next operation of the perforating device. The table is interrupted to provide an opening 17 beneath the perforating device. Any suitable intermittent power drive for the incremental operation of the feed rolls may be employed and of course alternatively the feed rolls may even be operated manually if desired although manual operation would not be practical from the standpoint of efficient production.

The perforating device comprises a header 18 disposed above the table so as to extend across the panel and is mounted for vertical reciprocation on uprights 20 on either side of the table. The header carries a plurality of piercing pins 19 which project downwardly therefrom in the spaced relation to one another corresponding to the desired pattern of perforations in the panel. The perforations are formed by the pins between intermittent advances of the panel upon downward movement of the header. Any suitable means including for example the crank 22 may be provided for raising and lowering the header 18.

Located beyond the perforating device in the direction of panel movement is a manifold pipe 24 which extends above the table and across the panel. The manifold pipe is fed with water through hose 25 maintained at an elevated temperature and has outlets or discharge orifices 26 in a row along the underside to discharge water constantly upon the upper surface of the panel during the time that it is intermittently advanced.

The water applied to the panel by the manifold pipe 24 is maintained at an elevated temperature of 120° F. to 212° F. which is the temperature at which steam will form under the atmospheric conditions in which this method is preferably carried out. The resin binder is sufficiently softened within this range. The preferred temperature range of the water is 180° F. to 212° F. to more completely soften the resin binder in to the center of the panel.

The water is supplied or discharged upon the upper surface of the panel during the entire time it is traveling through the perforating device. During such time, the panel of course is intermittently advanced and then stopped so that the perforating device can form the perforations therein. Thus the water is continuously discharged during the perforating operation upon the upper surface of the panel while the panel is held stationary during perforating and also while it is being advanced.

It is important that enough water be applied to the panel to completely cover its top surface so as to sufficiently moisten the fibrous and resin structure of the entire panel to render it ductile in order that it may be subsequently formed in the press without tearing. To insure that the entire upper surface of the panel is subjected to the water treatment, a wiper blade 28 disposed rearwardly of the water manifold pipe 24 extends above the table across the panel and engages the upper surface of the panel across the full width thereof to uniformly spread the water thereover. Some water is of course wiped off. That which is not will enter the fibrous material of the panel both through its flat top surface, its edges, and by way of the perforations. The perforations thus aid in conducting the water to the internal fibrous structure of the panel. The amount of water entering the panel structure is not so great that there is any possibility of later blowing when heated in the press because any excess is wiped off by the blade 28. There is no danger of the panel being over-treated with water because as stated the excess is wiped away. Actually, just enough water is used to cover the surface. The water temperature selected is such that it will soften the resin bond holding the fibers of the panel together sufficiently so that the fibers may shift during subsequent re-forming.

Water treatment of the panel in the manner above described is fast and efficient and can be carried out with a minimum of labor, in contrast to the separate steaming of panels in a steam chest as heretofore done.

Figure 5:
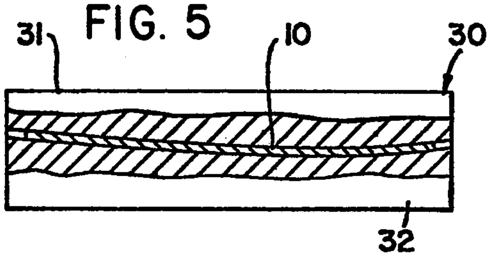
FIG. 5 is an elevational view with parts in section of the water-treated panel being re-formed between dies.
Figure 6:
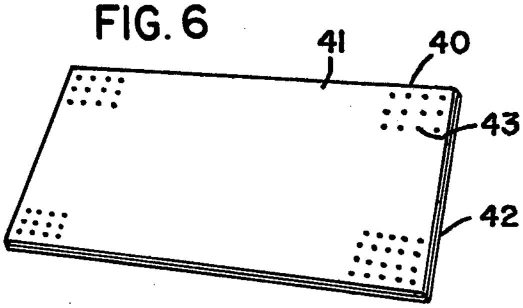
FIG. 6 is a perspective view of a sound-absorbing or decorative layer which may be a foam-backed vinyl sheet.
Figure 7:
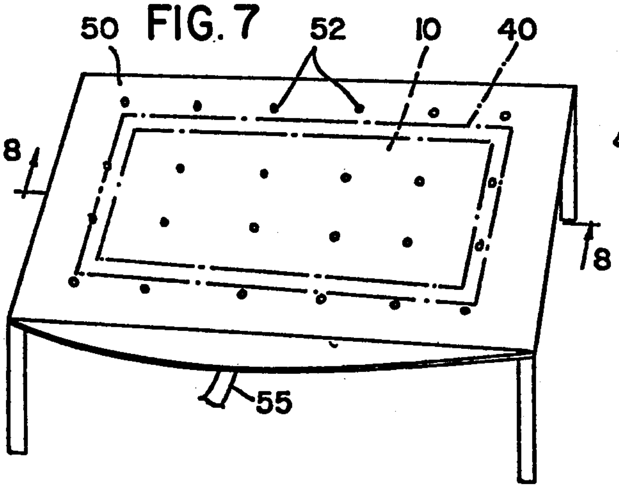
FIG. 7 is a perspective view showing in phantom lines the sound-absorbing or decorative layer laid over the re-formed fiberboard sheet upon a contoured support.
Figure 8:
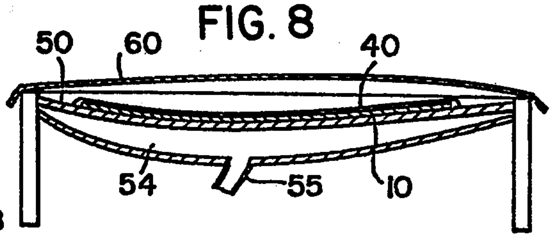
FIG. 8 is a sectional view taken on the line 8—8 on FIG. 7.

After being water-treated, the panel may then be re-formed in a press 30 as shown in FIG. 5 without the danger of being torn or of blowing. The press utilized is a heated press and sufficient pressure is used to cause a natural flow of the fibers particularly in the areas of substantial curvature. The conventional automotive headliner may be formed in a 300-ton press in approximately 1 minute at 475° F. At one or more intervals during the 1-minute period, the press dies 31 and 32 may be opened to de-gas, that is permit the escape of steam driven out of the internal structure of the panel by the heat of the press.

The panels are rendered flexible or bendable almost immediately after leaving the water treatment shown in FIGS. 2–4 and can be moved immediately to the hot press. However, they may be stored for as much as 12 to 24 hours after water treatment and will still retain enough moisture to permit re-forming in the hot press after storage or even after a longer period of time if they are covered so as to retain their moisture.

The re-formed panel when taken from the press is substantially dry and will hold its shape. It may be finished as by securing a rectangular sound-insulating or decorative layer 40 to its inner surface.

The layer 40 may for example be formed of a fabric or plastic sheet. Preferably the layer 40 is a vinyl trim cover composed of a sheet of vinyl material 41 which may or may not be backed with a thin layer of foam 42 such as polyurethane or latex. The vinyl trim cover or layer 40 may preferably be perforated as shown by holes 43 of the same or similar diameter to the holes in the fiberboard and spaced the same or different distances than the perforations in the fiberboard. The vinyl trim cover is cut to a slightly larger size than the fiberboard so as to overlap the fiberboard when initially secured thereto, after which the overlapped portions are cut away.

To secure the vinyl trim cover 40 to one side of the fiberboard, one side of the fiberboard is sprayed or coated with an adhesive. A suitable adhesive is a water soluble or water dispersed synthetic resinous adhesive, such for example as resin-latex. The fiberboard is laid upon an upper mold surface 50 preferably contoured to the general shape of the re-formed fiberboard with its adhesive coated side up. The vinyl trim cover 40 is laid over the fiberboard with its foam backing in contact with the adhesive coated surface so that the edges of the vinyl trim cover overlap the edges of the fiberboard. The mold surface 50 has holes 52 communicating with a vacuum chamber 54 therebeneath.

Figure 9:
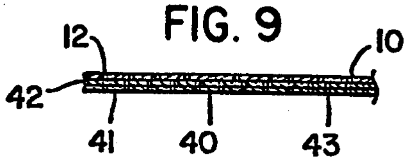
FIG. 9 is a fragmentary sectional view of the finished re-formed fiberboard sheet having the sound-absorbing or decorative layer adhered thereto

In order to press the foam backing of the vinyl trim cover against the adhesive coated surface of the fiberboard to form a secure bond, an imperforate sheet 60 of plastic or other material is laid over the mold surface 50 to seal around the edges of the mold surface. When vacuum is applied to the chamber 54 through pipe 55 by a suitable vacuum pump, not shown, the space between the mold surface and the cover sheet 60 is evacuated through the holes 52 to draw the cover sheet down tightly against the vinyl trim cover and press it against the fiberboard. The vacuum is applied to the cover sheet through the holes 52 around the edges of the fiberboard and the vinyl trim cover, and also through the holes 52 under the fiberboard by way of the perforations in the fiberboard and in the vinyl trim cover. It has been found that a vacuum on the order of about 5 inches of mercury for 10 to 12 seconds is sufficient to form a good bond between the foam backing and the fiberboard. Thereafter the vacuum is removed and the vinyl trim cover is trimmed so that its edges are flush with the edges of the fiberboard (see FIG. 9). It will be understood that a positive pressure, instead of vacuum, may be used to press the cover sheet against the vinyl trim cover and press the latter against the fiberboard. The headliner consisting of the re-formed fiberboard 10 and vinyl trim cover 40 is now complete and ready to be installed.

The fiberboard comes out of the press 30 retaining a temperature between about 140° F. and about 200° F. The adhesive is preferably sprayed on the fiberboard and the vinyl trim cover 40 adhered thereto by differential pressure immediately after the fiberboard leaves the press, while the temperature of the fiberboard is still within the elevated temperature range mentioned.

A water soluble adhesive such as the one in the example previously given is particularly well suited to the practice of this method. The heat of the panel accelerates the setting of the adhesive by driving out the water in the adhesive. Accordingly, the adhesive will fully set soon after the vinyl trim cover 40 is secured to it. On the other hand, the cure of the water based adhesive is gradual enough to permit a continuous operation from the press through the adhesive application to the adhesive bonding of the vinyl trim cover to the fiberboard.

Solvent type adhesives, while generally suitable for securing the trim cover to the fiberboard, tend to cure when heated more rapidly than water base adhesives, sometimes too rapidly, and may also produce toxic or flammable fumes which are not produced by water base adhesives.

Figure 10:
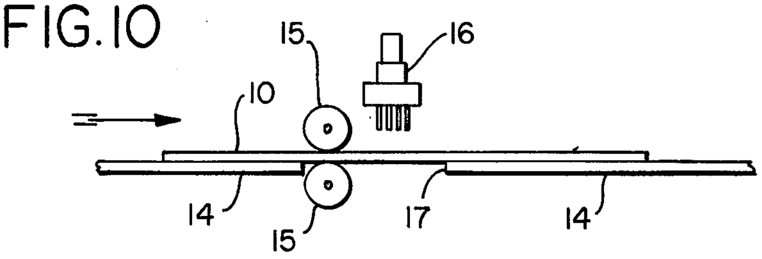
FIG. 10 is a diagrammatic view of apparatus similar to FIG. 2 for perforating the panel in accordance with a modification of the invention.
Figure 11:
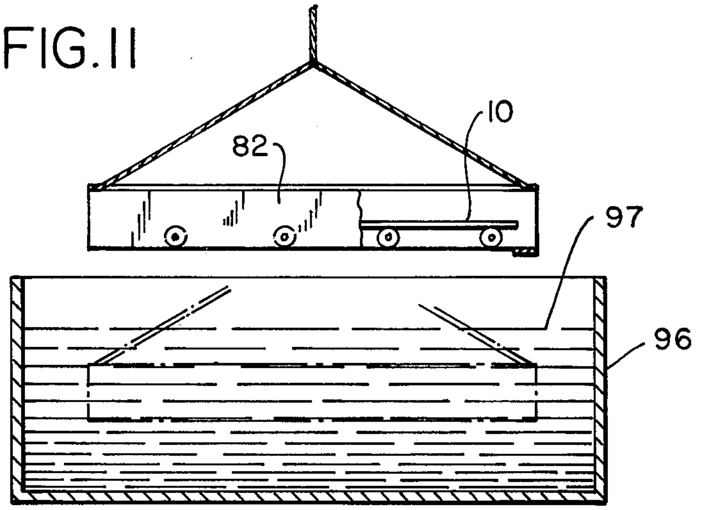
FIG. 11 illustrates apparatus for water treating the panel in accordance with the modification.
Figure 12:
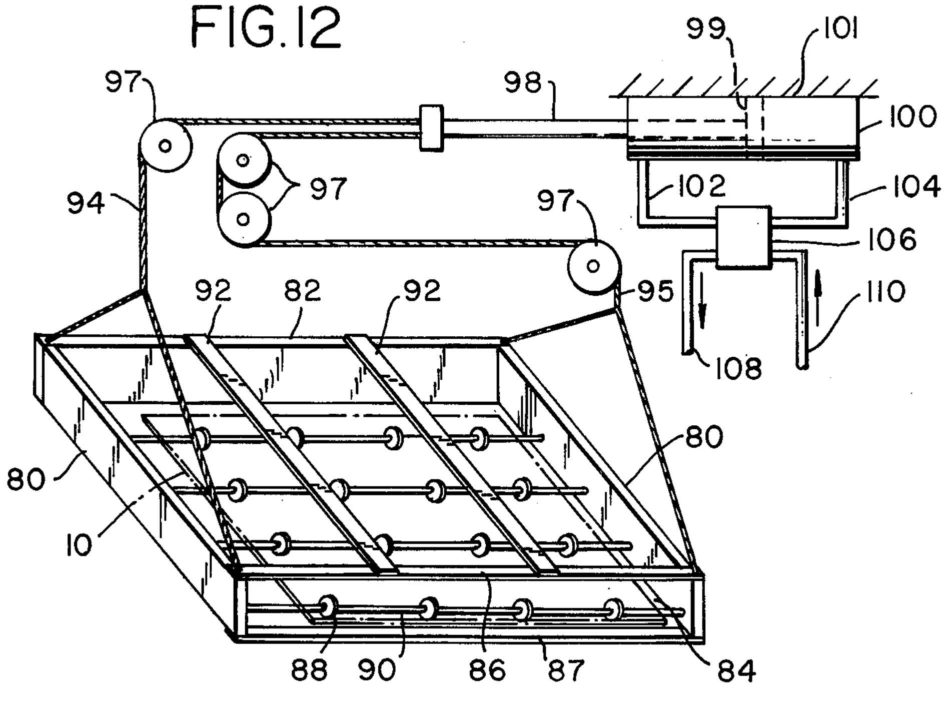
FIG. 12 is a perspective view of a portion of the apparatus of FIG. 11.

FIGS. 10–12 illustrate a modification of the invention in which the panel is perforated and water treated in separate operations. FIG. 10 is like FIG. 2 except that the water treating apparatus including the manifold pipe 24 and wiper blade 28 are omitted.

As stated previously, perforating may be omitted altogether, however, if the panel is to be perforated, then as shown in FIG. 10, the panel is advanced intermittently on table 14 in the direction of the arrow, as it was in FIG. 2, by the feed rolls 15. The same perforating device 16 as shown in FIGS. 2 and 3 is employed to form the perforations while the panel is stationary. Then the panel is advanced a further increment in preparation for the next operation of the perforating device. The same drive as utilized in the first embodiment or any suitable drive for the incremental operation of the feed rolls may be employed.

The separate water treatment of the perforated panel is carried out by the use of the apparatus shown in FIGS. 11 and 12. A flat, shallow, horizontal box in the form of a substantially open frame or cage 78 is provided for the support of the panel. This cage 78 is rectangular in form having the side walls 80 and the rear wall 82. The inside rectangular dimensions of the cage are slightly larger than the panel. The cage is open at the front as indicated at 84. Opening 84 is further defined by the vertically spaced horizontal bars 86 and 87 extending between the front edges of the side walls 80. The opening is sufficiently wider than the panel 10 that the panel may be readily inserted. The bottom of the cage is defined by a series of rollers 88 mounted on rods 90. The spaces between the rods and rollers are open. The rods 90 extend horizontally across the width of the cage in spaced relation from front to rear and are terminally connected to the side walls 80. Each rod carries a plurality of rollers 88 in spaced relation to define the bottom for the cage and to support the panel 10. Because of the rollers 88, the panels may be loaded through the open front with little or no friction. The top of the cage has bars 92 which are laterally spaced and secured at their ends to the rear wall 82 and to the top bar 86 to confine the panel 10 within the cage. The spaces between the bars 92 are open.

The cage 78 is suspended in horizontal position by flexible linear members or cables 94 and 95 for vertical movement into and out of a tank 96 placed beneath the cage and containing water up to the level indicated at 97. The temperature of the water is the same as that employed in the first embodiment, that is at least 120° F. up to 212° F. with a preferred temperature range of 180° F. to 212° F.

The cables 94 and 95 are connected to the corners of the cage and extend over idlers 97 which rotate freely on their fixed axes in the positions shown. The ends of the cables are secured to the rod 98 of a piston 99 reciprocable within fluid cylinder 100 secured to a support 101. Fluid is alternately introduced to and exhausted from the opposite end of the cylinder 100 through lines 102 and 104 under the control of a valve 106. In one position of the valve, fluid under pressure is directed from pressure line 108 into line 104 and relieved from line 102 to exhaust line 110 to lower the cage 78 into the tank to the position shown in phantom lines in which the cage is entirely immersed in the water. When the valve is reversed, the cage is raised out of the tank to the solid line position.

In use, the panel 10, after being perforated by the apparatus shown in FIG. 10, is inserted into the cage 78 through the open front 84 and assumes the position shown in FIG. 11 and in phantom lines in FIG. 12. The box is then lowered to the phantom line position of FIG. 11 to completely immerse the panel. The water immediately enters the cage through the open spaces between the rods 90 at the bottom and between bars 92 at the top to simultaneously contact all surface portions of the panel. The distance between rollers 88 and the top bars 92 is greater than the thickness of the panel so that the panel can float above the rollers in a freely suspended state in full contact with the water. The tank walls will prevent the panel from floating out of the cage. If the water is boiling, it will have a churning effect and thoroughly wet the panel.

The cage 78 during its entire movement remains horizontal so that the panel also is horizontal when it enters the water, during its entire treatment in the water and during its subsequent removal from the water. When the cage 78 is raised to the solid line position of FIG. 11, the water-treated panel 10 is removed and reformed in the press 30 shown in FIG. 5 in the manner set forth in the description accompanying FIG. 5 after which the operations previously described in connection with FIGS. 6–9 may be carried out. Preferably the water-treated panel is taken from the cage and transferred immediately to the press with only a second or a few seconds of elapsed time.

The method of treatment including the steps described in connection with FIGS. 10–12 produces a very uniformly water-treated panel. All portions of the panel enter the water at the same time. All portions of the panel are treated for the same period of time and all portions are removed from the tank at the same time. Accordingly, no one portion of the panel will begin to lose its moisture before another. A uniformly water-treated part is then ready for forming in the press 30.

The time of immersion of the panel 10 in the tank 96 may vary depending for example on how sharp a bend or contour is to be molded into the finished part. The cycle time of immersion may for example run from 3 seconds to 40 seconds. The longer the immersion time the more thoroughly is the panel treated and therefore the sharper the bend that may be molded into the panel without damaging it. Of course a shorter cycle time is desirable in order to increase production. The cycle time is for this reason kept as short as possible consistent with the treatment necessary to form the desired bends and contours in the press without cracking or creasing the panel.

The panel 10 may be of single ply construction or it may consist of more than one ply. In a multi-ply construction, each of the plies or layers may be of the same fibrous material as described hereinabove. Alternatively, at least one ply may be of a different material and/or construction, such as plastic. A multi-ply panel 10 may, for example, consist of a sheet of expanded polystyrene having a substantial resistance to bending and having a sheet of fibrous material secured as by a suitable adhesive to one or both sides thereof. The sheet or sheets of fibrous material may be Kraft linerboard. While dimensions may vary, a multi-ply panel 10 suitable for use as a headliner may consist of a plastic sheet of expanded polystyrene having a thickness on the order of about 0.120 inches with a sheet of 42 lb. Kraft linerboard having a thickness on the order of about 0.015 inches secured by a suitable adhesive to each side of the plastic sheet.

The methods heretofore disclosed may be used to treat and re-form all of the panels described in the preceding paragraph. In the case of the expanded polystyrene-Kraft linerboard panel, the Kraft will be rendered soft and sufficiently ductile to permit forming in the press without tearing or blowing by the water treatment previously described in FIGS. 1–9 and also FIGS. 10–12. The molding of the polystyrene-Kraft board in press 30 in the manner set forth in the description accompanying FIG. 5 will re-form both the polystyrene layer and the Kraft layer to the desired contour. The temperatures and times set forth for the operation of the press may be used also to re-form the polystyrene-Kraft panel since the polystyrene, as well as the Kraft, can be re-formed and take a new set under those conditions.

What I claim as my invention is:

1. A method of forming a curved flexible substantially self-supporting sheetlike structure, comprising the steps of providing a panel comprising a sheet of fibrous material formed of wood fibers in a resin binder and having a substantial resistance to bending and being capable of being softened and made sufficiently ductile to permit forming compound curvatures in it without tearing or blowing by the application thereto of water at a temperature in the range of 180° F. to 212° F., providing a body of water at a temperature in said range, totally immersing said panel in said body of water for from 3 seconds to 40 seconds, thereafter placing the panel between heated dies and forming a compound curvature in the same by the application of heat and pressure to the opposite sides thereof by said dies, and holding the panel between said dies until sufficiently dry to hold its shape.

2. A method as defined in claim 1, wherein the body of water is boiling at 212° F.

3. A method as defined in claim 1 wherein said panel is placed between said dies immediately after removal from said body of water.

4. A method as defined in claim 1 wherein said panel is immersed by moving the same while in a horizontal position vertically downward into said body of water and thereafter is withdrawn from said body of water by moving the same vertically upward while still in a horizontal position.

5. A method as defined in claim 1, wherein said panel comprises a plastic sheet secured in surface-to-surface relation to one side of said sheet of fibrous material.

6. A method as defined in claim 5, wherein said sheet of fibrous material is formed of Kraft linerboard and said plastic sheet is formed of expanded polystyrene.

* * * * *